United States Patent
Kawai (10) Patent No.: US 7,912,163 B2
(45) Date of Patent: Mar. 22, 2011

(54) WIRELESS RECEIVING DEVICE HAVING LOW POWER CONSUMPTION AND EXCELLENT RECEPTION PERFORMANCE

(75) Inventor: Katsutoshi Kawai, Ichinomiya (JP)

(73) Assignee: Kyocera Corporation, Kyoto (JP)

( * ) Notice: Subject to any disclaimer, the term of this patent is extended or adjusted under 35 U.S.C. 154(b) by 1289 days.

(21) Appl. No.: 11/482,743

(22) Filed: Jul. 10, 2006

(65) Prior Publication Data

US 2007/0014389 A1 Jan. 18, 2007

(30) Foreign Application Priority Data

Jul. 13, 2005 (JP) ................................ 2005-204691

(51) Int. Cl.
*H04B 1/10* (2006.01)
(52) U.S. Cl. ........ 375/354; 375/355; 375/376; 375/359; 375/371; 375/373; 370/503; 370/516; 327/141; 327/156; 327/158; 327/159; 327/160
(58) Field of Classification Search .................. 375/354, 375/355, 359, 371, 373, 375, 376; 370/503, 370/516; 327/141, 156, 158, 159, 160
See application file for complete search history.

(56) References Cited

U.S. PATENT DOCUMENTS

| | | | | |
|---|---|---|---|---|
| 5,619,524 | A * | 4/1997 | Ling et al. | 375/130 |
| 6,879,646 | B2 * | 4/2005 | Arambepola | 375/326 |
| 2002/0021519 | A1 * | 2/2002 | Rae | 360/51 |
| 2003/0067963 | A1 * | 4/2003 | Miller et al. | 375/130 |
| 2004/0004962 | A1 * | 1/2004 | Glazko et al. | 370/375 |
| 2004/0120387 | A1 * | 6/2004 | Bultan et al. | 375/149 |
| 2007/0071153 | A1 * | 3/2007 | Eglit | 375/355 |

FOREIGN PATENT DOCUMENTS

| | | |
|---|---|---|
| JP | 09-064857 A | 3/1997 |
| JP | 2001-257731 A | 9/2001 |
| JP | 2002-532956 A | 10/2002 |
| JP | 2003-158557 A | 5/2003 |
| JP | 2004-096170 A | 3/2004 |
| WO | 00/35140 A1 | 6/2000 |
| WO | 03/045026 A1 | 5/2003 |

OTHER PUBLICATIONS

Japanese Office Action dated Jul. 29, 2008 (mailing date), issued in corresponding Japanese Patent Application No. 2005-204691.

* cited by examiner

*Primary Examiner* — Chieh M Fan
*Assistant Examiner* — Santiago Garcia
(74) *Attorney, Agent, or Firm* — Morrison & Foerster LLP (57) ABSTRACT

The A/D converter changes sampling timing of a received signal in a synchronization acquisition mode and a synchronization tracking mode. The A/D converter generates an internal clock of a sampling frequency eight times a symbol rate under the control of the clock control unit in the synchronization acquisition mode. On the other hand, in the synchronization tracking mode, the A/D converter generates an internal clock with a symbol point and one each point before and after the symbol point as sampling timing under the control of the clock control unit. The A/D converter further corrects the sampling timing of the symbol point based on the squares of the maximum value of a correlation value between the received signal and a reference signal and the absolute values of correlation values before and after the maximum value.

4 Claims, 8 Drawing Sheets

WIRELESS RECEIVING DEVICE HAVING LOW POWER CONSUMPTION AND EXCELLENT RECEPTION PERFORMANCE

BACKGROUND OF THE INVENTION

1. Field of the Invention

The present invention relates to a wireless receiving device and, more particularly, a wireless receiving device for use, for example, for a base station in a mobile communication system which realizes high-speed and large-capacity communication such as data communication.

2. Description of the Background Art

In a mobile communication system (e.g. PHS: Personal Handyphone System), communication is executed between a mobile terminal device (hereinafter referred to as a terminal) and a radio base device (hereinafter referred to as a base station) by using a predetermined modulation system, for example, a known π/4 shift QPSK (Quadrature Phase Shift Keying) system.

In particular, on a reception side of the mobile communication system, a received signal is demodulated by using a predetermined demodulation system corresponding to a predetermined modulation system adopted on a transmission side (see e.g. Japanese Patent Laying-Open No. 2003-158557).

Figure 8:
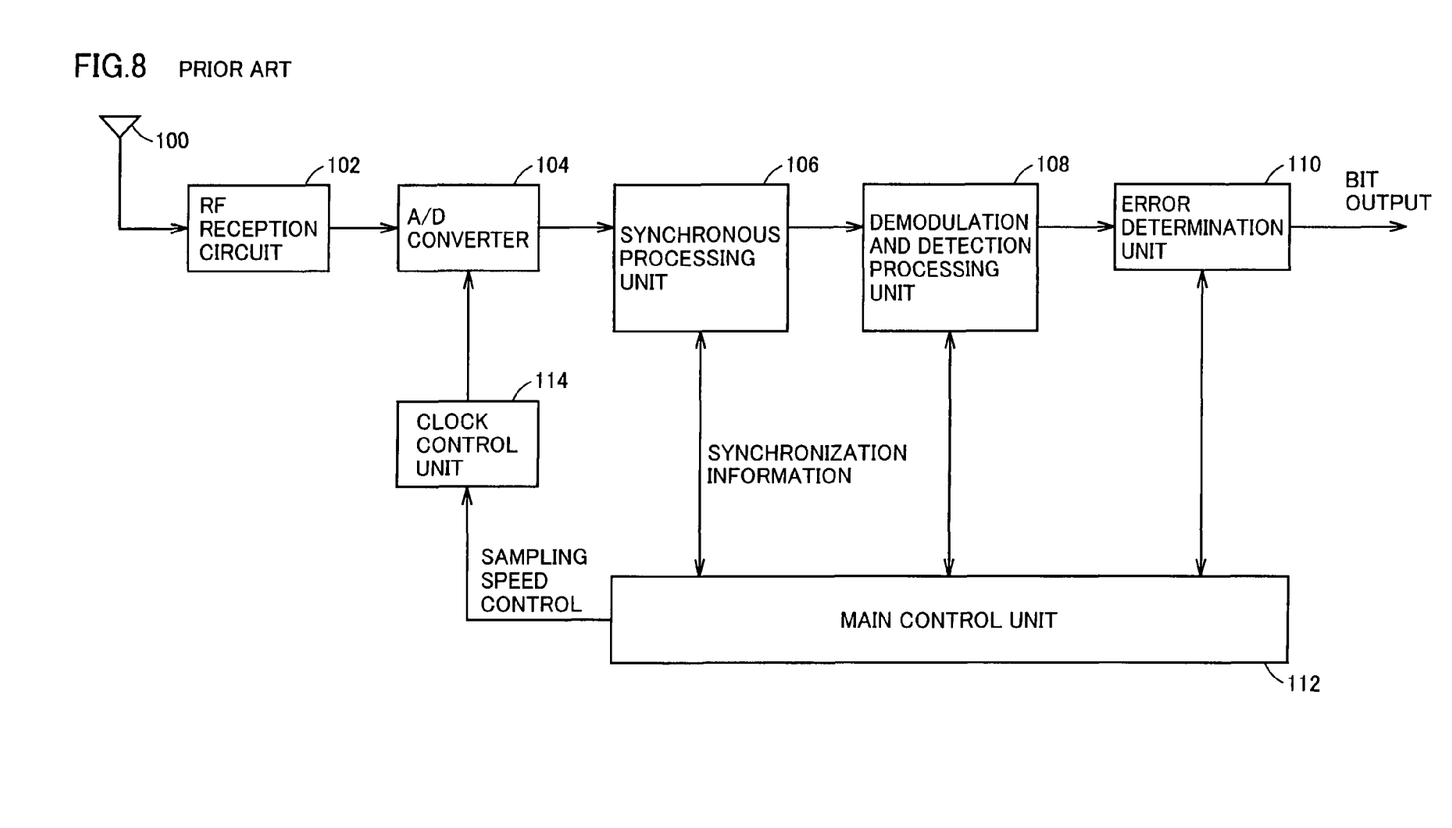
FIG. 8 is a functional block diagram showing a structure of a wireless receiving device of a conventional PHS adopting the π/4 shift QPSK system.

FIG. 8 is a functional block diagram showing a structure of a conventional PHS wireless receiving device (e.g. base station) adopting the π/4 shift QPSK system.

With reference to FIG. 8, a transmission signal with a radio frequency (RF) from other wireless device not shown is received by an antenna 100 and applied to an RF reception circuit 102. RF reception circuit 102, which includes an amplifier and a frequency conversion circuit not shown, subjects a received signal to necessary analog processing such as amplification and frequency conversion to convert the signal into an analog reception signal with an intermediate frequency (IF). The analog reception signal with the intermediate frequency is thereafter converted into a digital reception signal with a predetermined sampling frequency by an analog/digital (A/D) converter 104.

The digital reception signal is further applied to a synchronizing signal processing unit 106. Synchronous processing unit 106 obtains a correlation value peak by the correlation method with respect to a synchronization estimation period with a predetermined signal length to estimate a position corresponding to the correlation value peak as a synchronous position. Information related to a synchronous position and digital data of a received signal are transferred to a demodulation and detection processing unit 108.

Demodulation and detection processing unit 108 demodulates a received signal with a length of the synchronization estimation period with respect to an obtained synchronous position as a basis and applies the result to an error determination unit 110.

Error determination unit 110 compares a demodulated received signal with a length of a synchronization estimation period and a reference signal held in advance in a main control unit 112 and determines whether they are coincident or not, that is, whether an error exists to notify main control unit 112 of the result.

When the determination by error determination unit 110 finds that the two signals are coincident to result in determining that there is no error, demodulation and detection processing unit 108 considers the synchronous position as a true synchronous position to demodulate the entire received signal (data of one slot) with respect to the synchronous position as a basis, so that the demodulation output is output as a bit output through error determination unit 110.

In this structure, timing of sampling of an analog reception signal by A/D converter 104 is determined according to an instruction from a clock control unit 114. In more detail, A/D converter 104 adjusts timing of an internal clock generated internally in response to a control signal from clock control unit 114. The unit further samples the analog reception signal at the timing of the internal clock.

Here, in the wireless receiving device, in order to precisely sample a symbol point to prevent generation of a reception error in a signal processing unit at a succeeding stage, oversampling is executed of making a sampling frequency be higher than a symbol frequency (hereinafter also referred to as a symbol rate).

Figure 9:
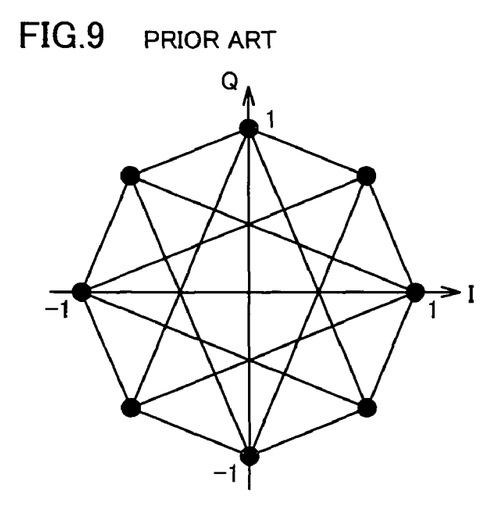
FIG. 9 is a signal space diagram (transition diagram) of the π/4 shift QPSK system.

FIG. 9 is a signal space diagram (transition diagram) of the π/4 shift QPSK system. In FIG. 9, transitional symbol points are linked by straight lines. In the π/4 shift QPSK system having a relatively small number of modulation multiple-valued numbers, a distance between transitional symbol points is relatively longer than that of a modulation system having a large number of modulation multiple-valued numbers which will be described later. In a conventional mobile communication system adopting such π/4 shift QPSK system, commonly adopted as a sampling frequency is four times a symbol rate.

Here, in a conventional mobile communication system, when over-sampling is executed at four times the symbol rate, even if timing of a sampled symbol point deviates from original timing, the frequency of generation of a reception error at the time of signal processing is extremely low.

This is because in the π/4 shift QPSK system, as shown in FIG. 9, symbol points are relatively apart from each other on the IQ coordinate plane, so that even if timing of the symbol point slightly deviates, the symbol point is correctly recognized as an original symbol point to prevent a reception error from occurring in signal processing.

On the other hand, in recent mobile communication systems, higher-speed and larger-capacity data transmission is demanded such as in data communication than in conventional voice communication and therefore modulation systems have been developed having more multiple-valued numbers than those of the above-described π/4 shift QPSK system. Known as one example of multiple-valued modulation systems of this kind is the 16QAM (Quadrature Amplitude Modulation) system which has been already put into practical use in certain kind of data communication.

Figure 10:
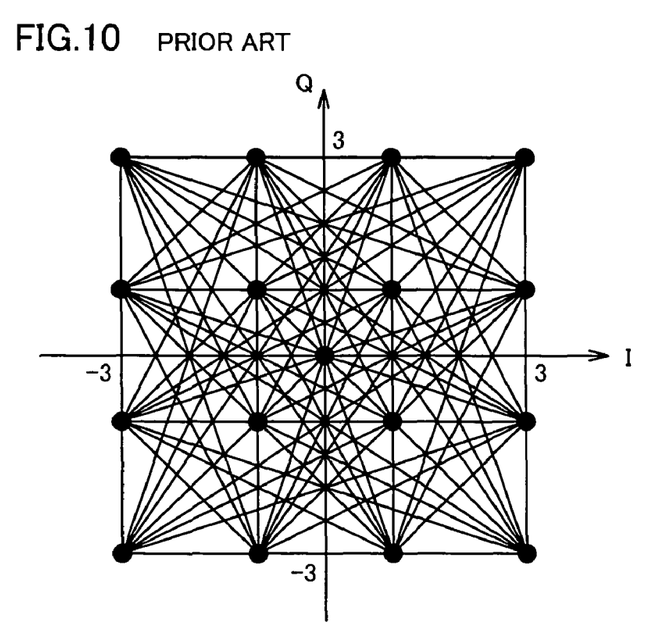
FIG. 10 is a signal space diagram (transition diagram) of the 16QAM system.

FIG. 10 shows a signal space diagram (transition diagram) of the 16QAM system. In the 16QAM system, a symbol point of a received signal corresponds to any of a total of 16 signal points as a whole of the coordinate plane which are arranged four each in lattice in each quadrant on the IQ coordinate plane. This enables transmission of 4-bit data indicative of any of 16 signals at once.

On other hand, in the 16QAM system, because a distance between symbol points are short to congest, when the system is adopted as a PHS modulation system, if timing of symbol point sampling is inappropriate, the symbol points might be erroneously recognized to generate a reception error in signal processing.

Under these circumstances, for preventing a reception error resulted from such a deviation of sampling timing as in a multiple-valued modulation system, effective is increasing a sampling frequency in A/D converter 104 of FIG. 8.

Increasing a sampling frequency, however, involves an increase in the amount of digital signal processing at synchronous processing unit 106 at the succeeding stage to require enormous time for processing. Also involved is an increase in power consumption required for signal processing.

SUMMARY OF THE INVENTION

An object of the present invention is to provide a wireless receiving device enabling generation of a reception error to be prevented with low power consumption.

According to one aspect of the present invention, a wireless receiving device which receives a modulated signal to execute demodulation processing includes a mode setting unit for setting a synchronization acquisition mode or a synchronization tracking mode, a signal conversion unit for converting a received signal into a first digital signal having a first number of samples in the synchronization acquisition mode, a synchronous position detection unit for detecting a synchronous position of a converted first digital signal in the synchronization acquisition mode, a storage unit for storing a detected synchronous position in the synchronization acquisition mode, a demodulation processing unit for executing demodulation processing of the first digital signal based on a detected synchronous position in the synchronization acquisition mode and an error determination unit for determining whether a demodulated first digital signal has a reception error nor not. The mode setting unit sets the synchronization tracking mode in response to determination that no reception error exists made by the error determination unit. The signal conversion unit converts a received signal into a second digital signal having a second number of samples less than the first number of samples in the synchronization tracking mode. The demodulation processing unit executes demodulation processing of the second digital signal based on a synchronous position stored in the storage unit in the synchronization tracking mode.

Preferably, the second number of samples is set such that from a received signal, at least a symbol point and points before and after the symbol point are included in sampling timing.

Preferably, the wireless receiving device further includes a timing deviation detection unit for detecting a deviation of timing of a symbol point in the second digital signal from timing of a correct symbol point and a timing deviation correction unit for correcting sampling timing of the second number of samples according to a detected deviation. The timing deviation detection unit includes a determination unit for determining timing at which a correlation value between the second digital signal and a predetermined reference signal attains a maximum value as timing of a symbol point in the second digital signal and a calculation unit for calculating an amount and a direction of a deviation based on a relationship between the absolute values of correlation values before and after a maximum value and the absolute value of the maximum value. The timing deviation correction unit corrects the sampling timing of the second number of samples based on the calculated amount and direction of deviation.

Preferably, the deviation amount and direction calculation unit includes a division unit for calculating a difference between squares of the absolute values of correlation values before and after a maximum value to divide the calculated difference by the square of the absolute value of the maximum value, a comparison unit for comparing a value obtained as a result of the division with a predetermined threshold value and a decision unit for, when an obtained value is larger than a threshold value, deciding the amount and the direction of a deviation based on the obtained value.

Preferably, the deviation amount and direction calculation unit includes a decision unit for deriving a parabola passing through a maximum value and correlation values before and after the maximum value to decide the amount and a direction of a deviation based on a difference between timing which gives a maximal value of the derived parabola and timing of a symbol point of the second digital signal.

The present invention enables a mobile communication system such as a PHS to obtain excellent reception performance while suppressing power consumption by excessive over-sampling.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, the embodiment of the present invention will be described in detail with reference to the drawings. In the drawings, the same or corresponding parts will be denoted by the same reference numerals to omit their description.

Figure 1:
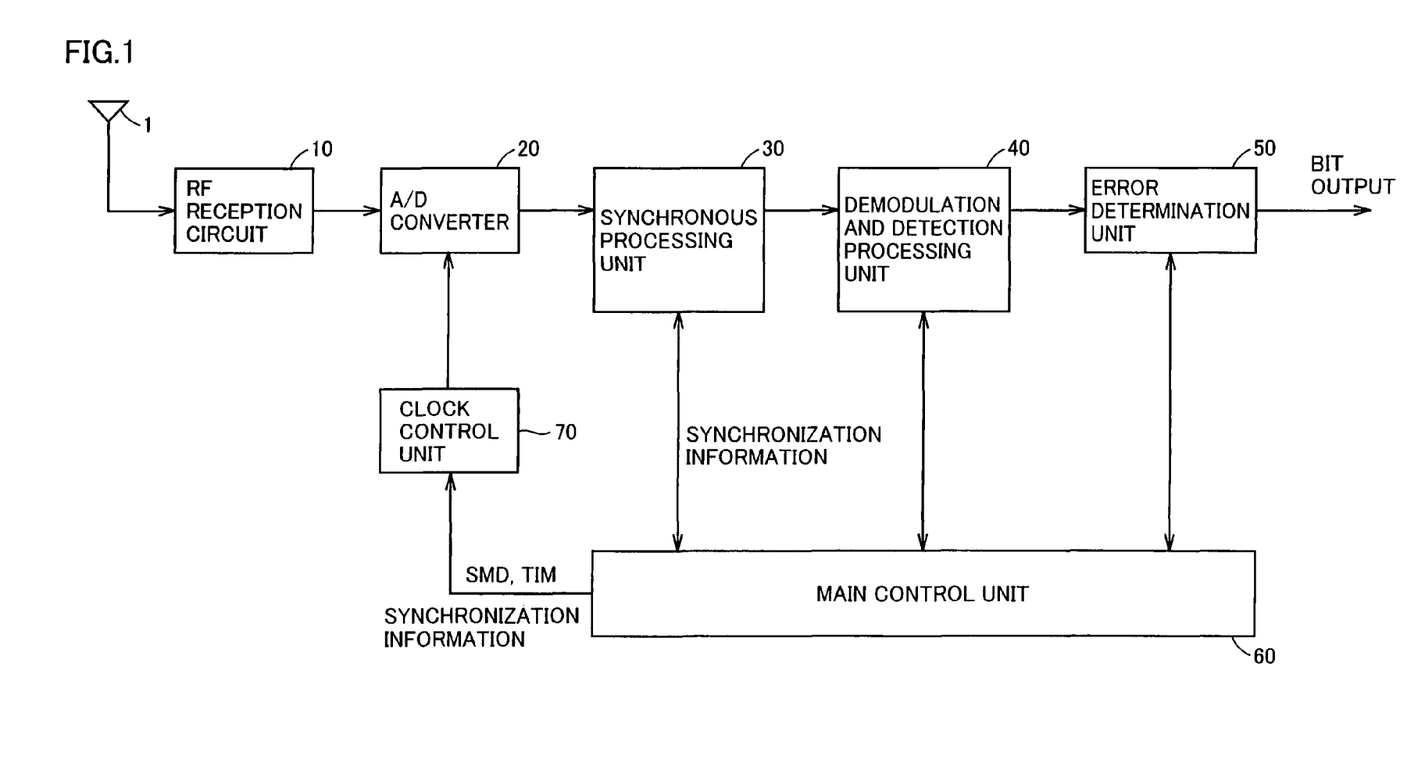
FIG. 1 is a functional block diagram showing a structure of a wireless receiving device according to an embodiment of the present invention.

FIG. 1 is a functional block diagram showing a structure of a wireless receiving device applied to a base station of such a mobile communication system as a PHS according to the embodiment of the present invention.

With reference to FIG. 1, the wireless receiving device includes an antenna 1, an RF reception circuit 10, an A/D converter 20, a synchronous processing unit 30, a demodulation and detection processing unit 40, an error determination unit 50, a main control unit 60 and a clock control unit 70.

A transmission signal from other wireless device not shown is received by antenna 1 and subjected to necessary analog processing such as amplification and frequency conversion at RF reception circuit 10. The received signal is thereafter converted into digital sampling data at A/D converter 20 and applied to synchronous processing unit 30.

Now, consider a case where the 16QAM system is adopted as a multiple-valued modulation system for the wireless receiving device shown in FIG. 1.

Even when the 16QAM system is adopted, A/D converter 20 samples an analog reception signal at a predetermined sampling frequency in response to a control signal from clock control unit 70 similarly to the case of the π/4 shift QPSK system used so far. The sampling frequency in this case is higher than four times a symbol rate applied to the π/4 shift QPSK system, and is set to be eight times the symbol rate in order to detect a precise synchronous position.

When in A/D converter 20, the analog reception signal is converted into a digital reception signal, the converted digital reception signal is transmitted to synchronous processing unit 30 to estimate a synchronous position.

Estimation of a synchronous position represents, when the base station receives a signal from a terminal by time division multiplexing, specifying at which position on an absolute time base an information part of the received signal starts excluding an unnecessary part at the beginning of the signal. In the present embodiment, adopted as a synchronous position estimation method is a so-called correlation method.

In the correlation method, first in view of the fact that a signal received from a terminal includes a reference signal known in common to all the users, the reference signal is stored in a memory of the base station in advance. Used as the reference signal, for example, in PHS, is a combination between a preamble and a unique word, with the preamble formed of a repetition of a bit string "1001" and the unique word formed of a predetermined bit string which varies with transmission from the terminal side and transmission from the base station side.

Figure 2:
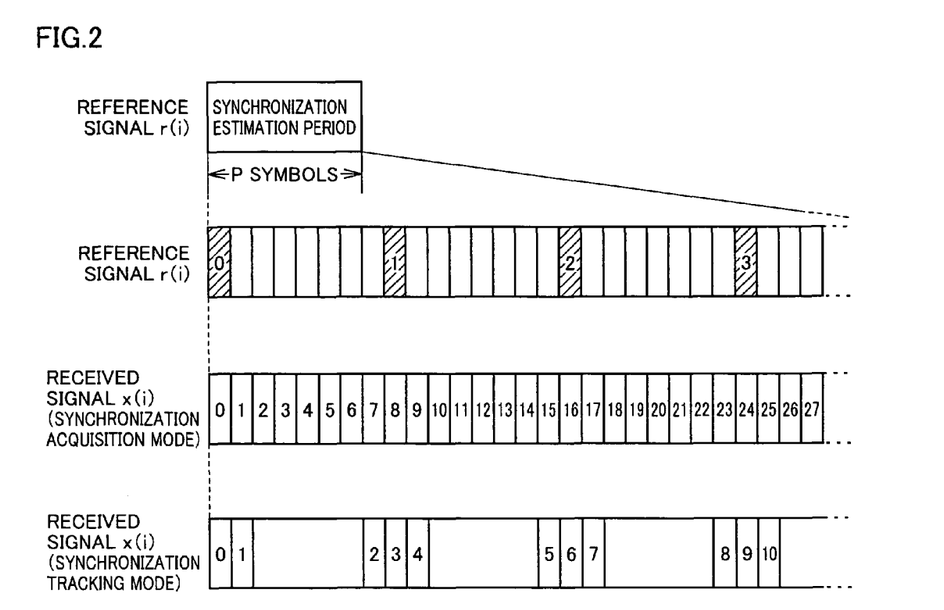
FIG. 2 is a timing chart schematically showing a relationship between a reference signal r(i) and a received signal x(i) in a synchronous position estimation method according to the embodiment.

FIG. 2 is a timing chart schematically showing a relationship between reference signal r(i) (i=0~P−1) and received signal x(i) in the synchronous position estimation method according to the present embodiment.

Reference signal r(i), whose signal period length corresponds to P symbols, has information only at symbol points corresponding to parts denoted by the slanting lines in the figure.

On the other hand, received signal x(i) is subjected to over-sampling of executing sampling at a higher frequency than a symbol rate for taking in the signal with high precision. In FIG. 2, executed is eight-times over-sampling including 8 samples between symbols.

The base station cuts out a received signal x(i) equivalent to the reference signal length (P symbols) out of the signal string of the received signal while displacing the signal to calculate a value of correlation with the reference signal stored in advance in a memory (not shown).

At this time, when the cut out received signal x(i) coincides with the reference signal, the correlation value becomes high and otherwise becomes low. At a time position at which a signal on the time base of received signal x(i) and reference signal r(i) coincide, a correlation value between them takes a sharp peak value. Detecting a time position at this time enables a synchronous position on the time base to be specified.

An operation mode, with a synchronous position of a received signal yet to be defined, of detecting a synchronous position by using the correlation method to establish synchronization as described above will be referred to as "synchronization acquisition mode". A synchronous position specified in the synchronization acquisition mode is applied to demodulation and detection processing unit 40 and is also stored in an internal memory of main control unit 60.

Demodulation and detection processing unit 40 executes demodulation processing with the applied synchronous position as a starting position of a frame of the received signal and applies the result to error determination unit 50.

Error determination unit 50 compares a demodulated received signal with a length of a synchronization estimation period and the reference signal held in main control unit 60 in advance to determine whether they are coincident or not, that is, an error exists or not, and notifies main control unit 60 of the result.

When the determination by error determination unit 50 results in finding that the signals are coincident and that no error exists, demodulation and detection processing unit 40 considers the synchronous position as a true synchronous position to demodulate the entire received signal (data of one slot) with respect to the synchronous position as a basis, so that the demodulation output is output as a bit output through error determination unit 50.

Thus, when the determination is made by error determination unit 50 that there is no error, synchronization is established. Once synchronization is established, unless an error successively occurs, the wireless receiving device tries to maintain the established synchronization. In contrast to the above "synchronization acquisition mode", this operation mode will be referred to as "synchronization tracking mode".

In the synchronization tracking mode, the above-described synchronous position estimation operation is not executed and the demodulation processing of a frame of a newly received signal is executed with the synchronous position stored in a memory not shown in main control unit 60 as a starting position. This is operation executed premised on that a synchronous position fails to vary at such a high speed as each frame per 5 milliseconds.

When an error is detected from an output signal obtained by the demodulation processing based on a fixed synchronous position, the synchronization tracking mode will be maintained unless the number of errors exceeds a predetermined threshold value.

On the other hand, when the number of errors occurring successively exceeds the threshold value, the synchronization tracking mode shifts to the synchronization acquisition mode to again detect a synchronous position by the correlation method.

When the wireless receiving device thus once shifts to the synchronization tracking mode, only a signal at the symbol point is extracted from received signal x(i) and subjected to the demodulation processing by the circuit at the succeeding stage.

Accordingly, since also in the synchronization tracking mode, similarly to the synchronization acquisition mode, continuing over-sampling at a high sampling frequency produces sampling points not required for the demodulation processing, the amount of digital signal processing in the circuit at the succeeding stage will be unnecessarily increased. As a result, time required for signal processing will be redundantly increased, while power will be uselessly consumed.

According to the present embodiment, therefore, the wireless receiving device is structured such that when the device shifts from the synchronization acquisition mode to the synchronization tracking mode, clock control unit 70 controls A/D converter 20 to operate with a less number of samples than that in the synchronization acquisition mode.

In detail, as shown in the lowest part of FIG. 2, it is arranged such that in the synchronization tracking mode, sampled from received signal x(i) are the symbol point and one point each before and after the symbol point.

With this arrangement, only a signal at a symbol point necessary for signal processing is sampled and a sampling point unnecessary for the signal processing is omitted, so that the number of samples is drastically reduced. Accordingly, generation of power which has been uselessly consumed by excessive over-sampling so far can be suppressed to considerably reduce time and the amount of power consumption required for the signal processing.

Thus, the present embodiment is characterized in that sampling timing in the synchronization tracking mode is obtained by sampling, in addition to a symbol point, one point each before and after the symbol point. In addition to realization of low power consumption by the reduction in the number of samples, this characteristic produces the effect of correcting a deviation of sampling timing which will be described in the following to continue the synchronization tracking mode.

As to such effect, description will be first briefly made of a sampling timing deviation occurring in A/D converter 20.

Figure 3A:
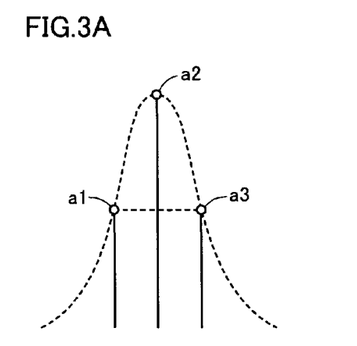
FIGS. 3A and 3B are diagrams each showing an expansion of a peak part of the square of a correlation value calculated by a synchronous processing unit in FIG. 1.
Figure 3B:
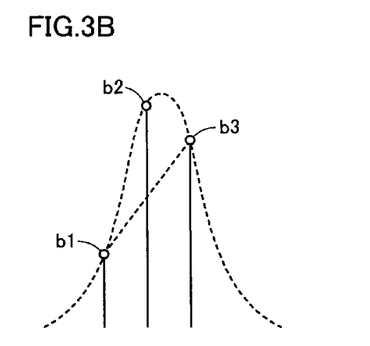

FIGS. 3A and 3B are diagrams each showing an expansion of a peak part of the square of a correlation value calculated by synchronous processing unit 30 shown in FIG. 1. White circle represents a sampling point corresponding to the square of each correlation value.

FIG. 3A shows a peak part of the square of a correlation value obtained when sampling is executed by A/D converter 20 at correct timing. In the figure, a point a2 indicative of the maximum value is at the peak of the square of the correlation value and points a1 and a3 of the squares of the correlation values before and after the point accordingly have approximately the same sum.

On the other hand, FIG. 3B shows a peak part of the square of a correlation value obtained when sampling is executed by A/D converter 20 at deviated timing. In this figure, a point b2 indicative of the maximum value is not at the peak of the square of the correlation value and points b1 and b3 of the squares of the correlation values before and after the point accordingly have different sums.

From the foregoing, detecting an amount of a difference between the squares of two correlation values (a1 and a3, b1 and b3) before and after the maximum value (a2, b2) of the square of the correlation value and a direction of the change enables determination how much and in which direction the maximum value of the correlation value deviates from a peak position, that is, how much and in which direction sampling timing deviates from the original timing.

The present embodiment therefore aims at enabling extraction of a symbol point at correct timing to maintain the synchronization tracking mode by sampling a desired symbol point estimated from an established synchronous position and one each point before and after the desired symbol point and obtaining the amount and the direction of a deviation of sampling timing from the absolute values of the squares of the correlation values at the relevant sampling points to correct the deviation.

More specifically, with respect to each of sampling points including the symbol point and one each point before and after the symbol point, a correlation value and a square value of the absolute value of the correlation value are calculated at synchronous processing unit 30 by complex multiplication and complex addition between received signal x(i) and reference signal r(i).

Next, based on the calculation result, the maximum value of the square value of the absolute value of the correlation value and a time position giving the maximum value are detected. Furthermore, a square value of the absolute value of the correlation value at each of the sampling points before and after the time position giving the maximum value are obtained.

Next, a difference between the absolute values of the square values of the correlation values before and after the time position giving the maximum value is obtained and the difference is divided by the maximum value. Quotient as of this time is assumed to be $\alpha$.

The obtained quotient a indicates the amount and a direction of a sampling timing deviation by its amount and sign, respectively. Accordingly, based on $\alpha$, sampling timing of A/D converter 20 is corrected.

As described in the foregoing, the wireless receiving device according to the present embodiment changes sampling timing of received signal x(i) in the synchronization acquisition mode and the synchronization tracking mode. First, A/D converter 20 over-samples received signal x(i) at timing necessary for establishing synchronization (at a sampling frequency higher than the symbol rate) in the synchronization acquisition mode. Subsequently, in the synchronization tracking mode executed after the synchronization is established, A/D converter 20 executes sampling at minimum timing necessary for correcting a deviation of sampling timing in order to maintain the established synchronization.

Control of timing of sampling at A/D converter 20 is executed by clock control unit 70 in FIG. 1. Upon reception of a signal SMD instructing on a synchronization mode and a signal TIM instructing on a timing deviation from main control unit 60, clock control unit 70 controls the sampling timing of A/D converter 20 according to the instruction contents of these signals.

In detail, upon receiving signal SMD instructing on the synchronization acquisition mode from main control unit 60, clock control unit 70 controls A/D converter 20 so as to generate, for example, an internal clock (in the following, the internal clock in the synchronization acquisition mode will be referred to also as a clock SCL1) with a sampling frequency eight times the symbol rate as shown in the middle part of FIG. 2. On the other hand, upon receiving signal SMD instructing on the synchronization tracking mode from main control unit 60, clock control unit 70 controls A/D converter 20 so as to generate, for example, an internal clock (in the following, the internal clock in the synchronization tracking mode will be referred to also as a clock SCL2) with a symbol point and one each point before and after the same as sampling timing. At this time, an interval between the symbol point and each point before and after the same is set to be equal to an interval of sampling in the over-sampling in the synchronization acquisition mode as shown in the lowest part of FIG. 2.

In the synchronization tracking mode, clock control unit 70 further corrects the sampling timing of A/D converter 20 in response to signal TIM instructing on the amount and a direction of a timing deviation. Thus, A/D converter 20 samples an analog reception signal at correct timing by an adjusted internal clock.

Figure 4:
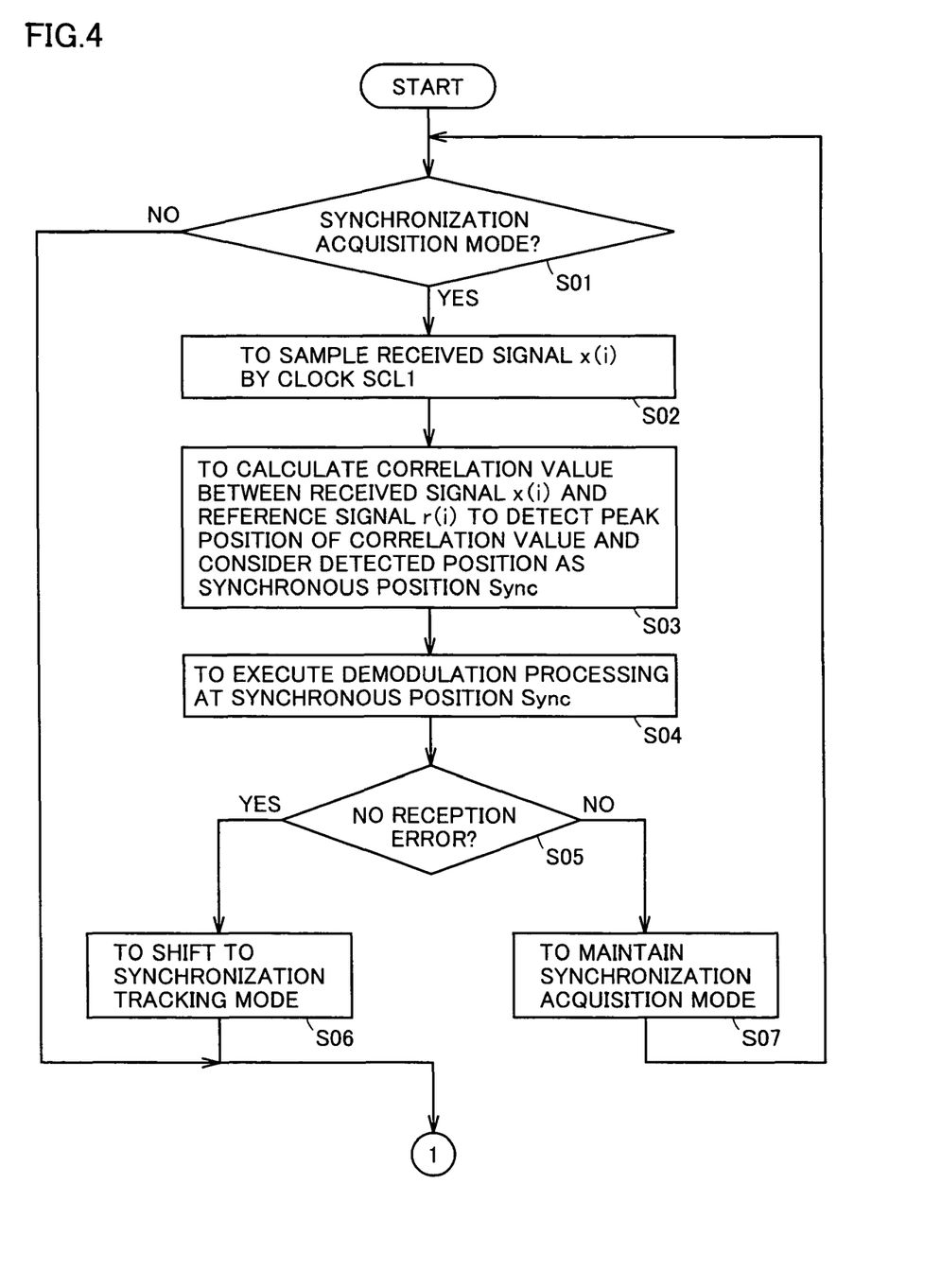
FIG. 4 is a flow chart for use in explaining a demodulation method executed by the wireless receiving device in FIG. 1.
Figure 5:
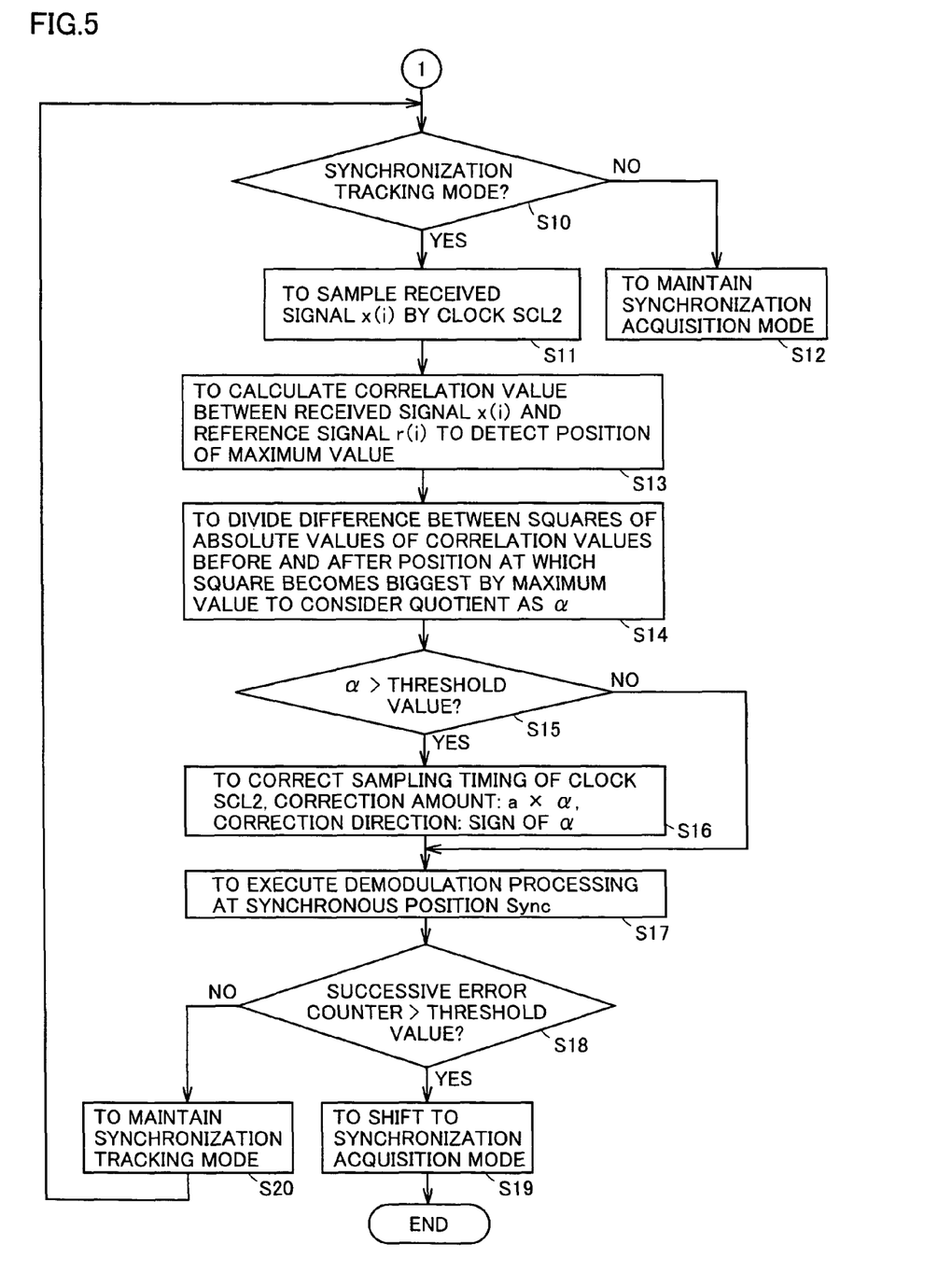
FIG. 5 is a flow chart for use in explaining the demodulation method executed by the wireless receiving device in FIG. 1.

FIG. 4 and FIG. 5 are flow charts for, in combination, explaining a demodulation method executed in the wireless receiving device shown in FIG. 1. Actual processing is executed in software according to the flow shown in FIG. 4 and FIG. 5 by a DSP (Digital Signal Processor) integrating main control unit 60, clock control unit 70 and a digital signal processing part (synchronous processing unit 30, demodulation and detection processing unit 40 and error determination unit 50).

With reference to FIG. 4, first, clock control unit 70 determines a synchronization mode based on signal SMD from main control unit 60 (Step S01).

When the determination is made that the synchronization mode is the synchronization acquisition mode at Step S01, clock control unit 70 controls A/D converter 20 so as to generate clock SCL1 having a desired sampling frequency (e.g. eight times the symbol rate). Responsively, A/D converter 20 samples received signal x(i) transmitted from RF reception circuit 10 by the generated clock SCL1 (Step S02). The sampled received signal x(i) is applied to synchronous processing unit 30.

Next, synchronous processing unit 30 estimates a synchronous position based on the correlation method with respect to received signal x(i). More specifically, synchronous processing unit 30 calculates a correlation value between received signal x(i) and predetermined reference signal r(i) to detect a time position where the calculated correlation value attains the peak. The detected time position is transmitted as a synchronous position Sync to main control unit 60 and demodulation and detection processing unit 40 (Step S03).

Demodulation and detection processing unit 40 executes demodulation processing with the applied synchronous position Sync as a starting position of the frame of received signal x(i) and applies the result to error determination unit 50.

Error determination unit 50 compares the demodulated received signal with a length of the synchronization estimation period and reference signal r(i) held in advance in main control unit 60 to determine whether they are coincident or not, that is, whether there exists an error and notifies main control unit 60 of the result (Step S05).

When the determination is made at Step S05 that no error exists, main control unit 60 considers synchronous position Sync as a true synchronous position to store the position in the internal memory (not shown), as well as shifting the synchronization mode from the synchronization acquisition mode to the synchronization tracking mode (Step S06, an arrow 1 in FIG. 4).

On the other hand, when the determination is made at Step S05 that an error exists, the synchronization acquisition mode is maintained to repeat the above-described operation of Steps S01 to S04 until determination is made that there is no error.

Next, with reference to FIG. 5, when the synchronization mode shifts from the synchronization acquisition mode to the synchronization tracking mode, clock control unit 70 receives signal SMD instructing that the synchronization mode is the synchronization tracking mode from main control unit 60 (Step S10). At this time, synchronous position Sync stored in the internal memory (not shown) in main control unit 60 is also applied to clock control unit 70.

Upon receiving signal SMD and information of synchronous position Sync, clock control unit 70 controls A/D converter 20 so as to generate clock SCL2 with the symbol point and each one point before and after the symbol point as sampling timing based on the signal and the information. Responsively, A/D converter 20 samples received signal x(i) by the generated clock SCL2 (Step S11). The sampled received signal x(i) is applied to synchronous processing unit 30.

Upon receiving received signal x(i), synchronous processing unit 30 corrects a deviation of sampling timing based on a correlation value between received signal x(i) and reference signal r(i). More specifically, a correlation value between the sampled received signal x(i) and reference signal r(i) and the square value of the absolute value of the correlation value are calculated. The unit further detects a time position at which the square value of the absolute value of the correlation value becomes the largest (Step S13), obtains a difference between the squares of the absolute values of the correlation values at the sampling points located before and after the time position and divides the difference by the maximum value of the absolute value of the square of the correlation value to assume the quotient to be $\alpha$ (Step S14).

Next, synchronous processing unit 30 determines whether the quotient $\alpha$ is larger than a predetermined threshold value (Step S15). The threshold value used here is set based on a correlation value obtained when a reception error might occur in the demodulation processing executed thereafter.

When the determination is made that the quotient $\alpha$ is larger than the predetermined threshold value at Step S15, an absolute value of $a \times \alpha$ as a multiplication of the quotient $\alpha$ by a predetermined coefficient a is assumed to be the amount of change of sampling timing, that is, the amount of correction of sampling timing at A/D converter 20. In addition, the sign of $\alpha$ is assumed to represent a direction of change of the sampling timing, that is, a correction direction of the sampling timing at A/D converter 20. Information about the correction amount and the correction direction of the sampling timing is applied as signal TIM to clock control unit 70 from main control unit 60. Clock control unit 70 controls A/D converter 20 so as to correct the sampling timing of clock SCL2 by the correction amount and the correction direction instructed by signal TIM (Step S16).

Next, when received signal x(i) is sampled using the corrected clock SCL2, demodulation processing of received signal x(i) is executed with synchronous position Sync as a starting position of the frame of received signal x(i) (Step S17). As a result, a correct symbol point is extracted to suppress generation of a reception error.

When reception errors are detected successively in a bit output obtained by the demodulation processing over the number of a predetermined threshold value due to a change of communication environments to such an extent that even such fine adjustment of sampling timing can not follow (Step S18), main control unit 60 determines that it is difficult to maintain the synchronization tracking mode to decide to shift the mode to the synchronization acquisition mode (Step S19). When returning to the synchronization acquisition mode, a synchronous position is again detected according to the flow shown in FIG. 4 described above.

On the other hand, unless the number of reception errors in a bit output exceeds the predetermined threshold value in the demodulation processing executed at Step S17, the synchronization tracking mode is maintained (Step S20).

Thus, according to the embodiment of the present invention, since sampling is executed at minimum timing necessary for maintaining synchronization in the synchronization tracking mode after once synchronization is established, low power consumption can be realized by suppressing useless power consumption caused by excessive over-sampling.

Furthermore, by correcting a deviation of sampling timing by using limited sampling timing, a symbol point can be extracted at correct timing to prevent a reception error from generating with low power consumed.

MODIFICATION EXAMPLE

The above-described embodiment is structured such that correction of a deviation of sampling timing in the synchronization tracking mode is executed by calculating the maximum value of the correlation value between sampled received signal x(i) and reference signal r(i) and a difference between the squares of the absolute values of the correlation values before and after the maximum value and deciding the amount and the direction of correction based on the amount of quotient obtained by dividing the calculated difference by the square of the absolute value of the maximum value. In the present modification example, description will be made of another structure for correcting a deviation of sampling timing. A wireless receiving device according to the present modification example is a modification of a processing method executed by synchronous processing unit 30 in the wireless receiving device shown in FIG. 1.

In detail, upon receiving sampled received signal x(i), synchronous processing unit 30 calculates a correlation value between received signal x(i) and reference signal r(i) and the square of the absolute value of the correlation value. The unit further detects a time position which gives the biggest square of the absolute value of the correlation value and calculates the squares of the absolute values of correlation values at the sampling points located before and after the time position.

Figure 6:
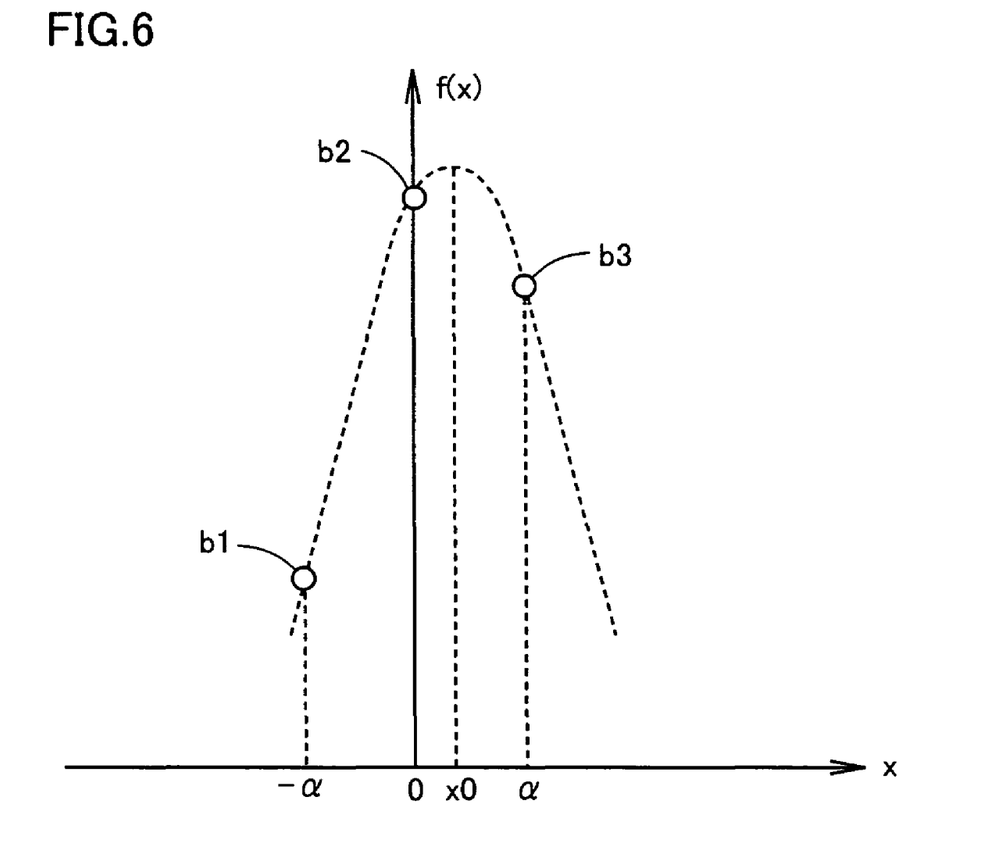
FIG. 6 is a diagram showing an expansion of a peak part of the square of a correlation value calculated by a synchronous processing unit of a wireless receiving device according to a modification example of the embodiment of the present invention.

Next, with respect to a relationship between maximum value (b2) of the square of the correlation value and the squares (b1 and b3) of the two correlation values before and after the maximum value shown in FIG. 6, synchronous processing unit 30 derives a parabola passing through these three points (b1 to b3).

In detail, as shown in FIG. 6, when sampling is executed by A/D converter 20 at deviated timing, point b2 indicative of the maximum value deviates from the peak of the square of the correlation value and points b1 and b3 of the squares of the correlation values before and after the point have different sums. Under these circumstances, assuming that three points b1, b2 and b3 are all located on the parabola represented by a dotted line in the figure, synchronous processing unit 30 determines that a time position (x=x0) corresponding to the peak of the assumed parabola indicates timing of a correct symbol.

More specifically, with the parabola shown in FIG. 6 represented by an Expression (1), assume that Expressions (2) to (4) hold for each of three points b1, b2 and b3.

$$f(x) = ax^2 + bx + c = a(x + b/2a)^2 + (4ac - b^2)/4a \quad (1)$$

$$f(-\alpha) = a\alpha^2 - b\alpha + c \quad (2)$$

$$f(0) = c \quad (3)$$

$$f(\alpha) = a\alpha^2 + b\alpha + c, \quad (4)$$

in which $x=-\alpha, 0, \alpha$ represent time positions of points (b1, b2, b3), respectively.

Here, as is clear from Expression (1), the parabola attains the peak at the time point $x=-b/2a$ (assumed to be $=x0$) and its maximal value $f(x0)$ is $(4ac-b^2)/4a$. Furthermore, according to the above-described Expressions (2) to (4), the time position (x=x0) corresponding to the peak will be given by an Expression (5).

$$x0 = -[f(\alpha) - f(-\alpha)]/[f(\alpha) + f(-\alpha) - 2f(0)] \cdot \alpha/2 \quad (5)$$

Synchronous processing unit 30 therefore determines that time position x0 obtained by Expression (5) is timing of a correct symbol point to consider a difference (i.e. x0) between time position (x=0) corresponding to the maximum value (b2) of the square of the correlation value and time position (x=x0) corresponding to the peak as the amount of correction of sampling timing at A/D converter 20. More specifically, an absolute value of difference x0 is considered as the amount of correction of the sampling timing and the sign of difference x0 as the direction of the correction of the sampling timing. Then, synchronous processing unit 30 outputs information about the amount of correction and the correction direction of the sampling timing to main control unit 60. Similarly to the above-described embodiment, main control unit 60 applies these information to clock control unit 70 as signal TIM. Clock control unit 70 controls A/D converter 20 to correct the sampling timing of clock SCL2 by the amount of correction and the correction direction instructed by signal TIM.

Figure 7:
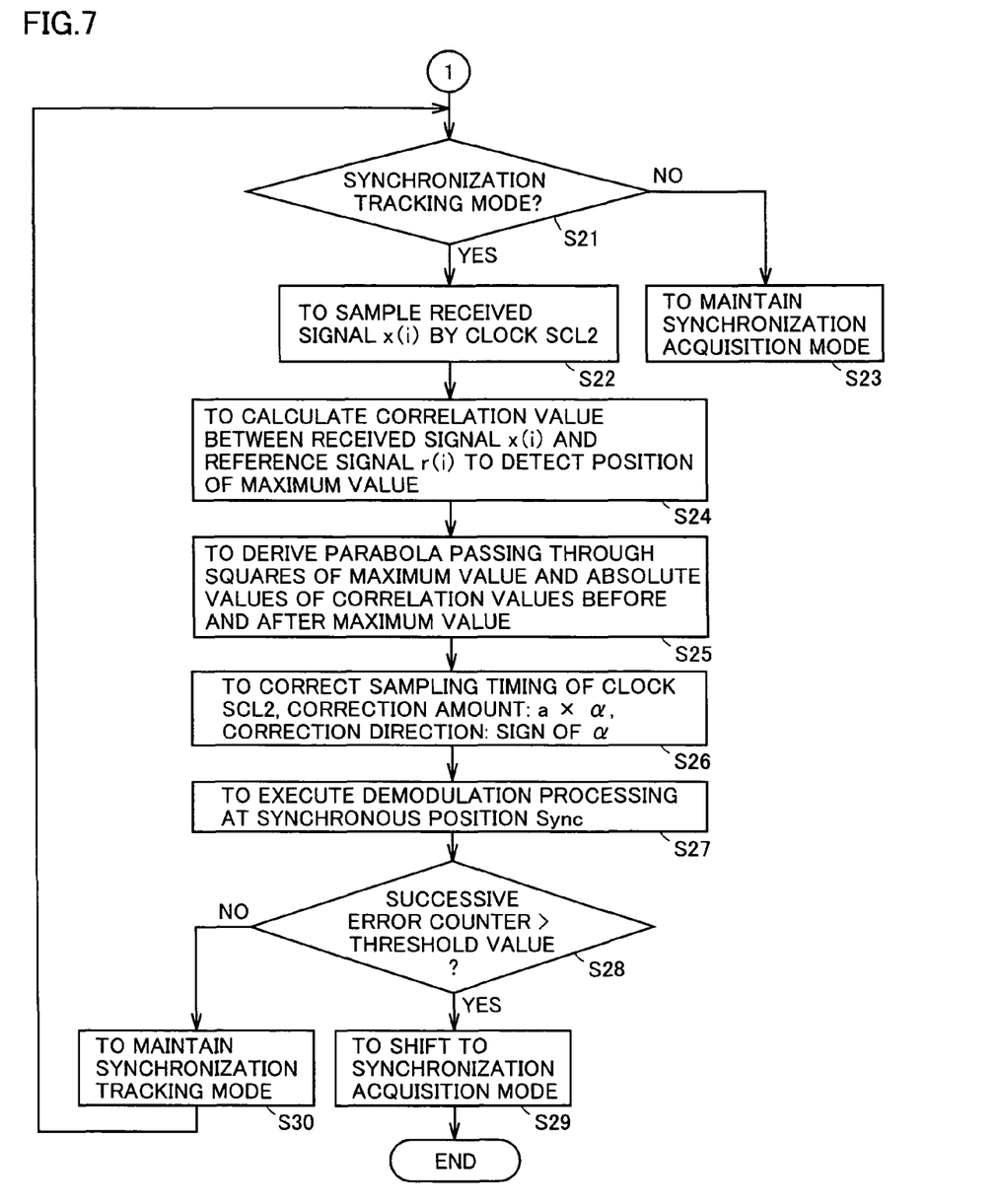
FIG. 7 is a flow chart for use in explaining a demodulation method executed by the wireless receiving device according to the modification example of the embodiment of the present invention.

FIG. 7 is a flow chart for use in explaining a demodulation method executed by the wireless receiving device according to the modification example of the embodiment of the present invention. The wireless receiving device according to the present modification example executes establishment of a synchronous position in the synchronization acquisition mode precedent to the flow chart shown in FIG. 7 by using the correlation method according to the flow chart in FIG. 4.

With reference to FIG. 7, when the synchronization mode shifts from the synchronization acquisition mode to the synchronization tracking mode, clock control unit 70 receives signal SMD indicating that the synchronization mode is the synchronization tracking mode from main control unit 60 (Step S21). At this time, synchronous position Sync stored in the internal memory (not shown) in main control unit 60 is also applied to clock control unit 70.

Upon receiving signal SMD and the information of synchronous position Sync, clock control unit 70 controls A/D converter 20 so as to generate clock SCL2 with the symbol point and each one point before and after the symbol point as sampling timing based on the signal and information. Responsively, A/D converter 20 samples received signal x(i) by the generated clock SCL2 (Step S22). The sampled received signal x(i) is applied to synchronous processing unit 30.

Upon receiving received signal x(i), synchronous processing unit 30 corrects a deviation of sampling timing based on a correlation value between received signal x(i) and reference signal r(i). In detail, the correlation value between sampled received signal x(i) and reference signal r(i) and a square value of the absolute value of the correlation value are calculated. Furthermore, a time position at which the square value of the absolute value of the correlation value becomes the largest is detected (Step S24) to obtain the squares of the absolute values of the correlation values at the sampling points located before and after the time position. Then, according to the above-described method, a parabola satisfying the squares of the absolute values of these three correlation values is derived (Step 25).

Next, synchronous processing unit 30 obtains difference x0 between time position (x=x0) corresponding to the peak of the derived parabola and time position (x=0) corresponding to the maximum value of the square of the correlation value to consider an absolute value of difference x0 as the amount of correction of the sampling timing at A/D converter 20. The unit also considers the sign of difference x0 as the correction direction of the sampling timing at A/D converter 20. Then, the information about the amount of correction and the correction direction of the sampling timing is applied as signal TIM from main control unit 60 to clock control unit 70. Clock control unit 70 controls A/D converter 20 to correct the sampling timing of clock SCL2 by the amount of correction and the correction direction instructed by signal TIM (Step S26).

Next, when sampling of received signal x(i) is executed by using clock SCL2 which has been corrected, demodulation processing of received signal x(i) is executed with synchronous position Sync as a starting position of the frame of received signal x(i) (Step S27). As a result, a correct symbol point is extracted to suppress generation of a reception error.

When reception errors are detected successively in a bit output obtained by the demodulation processing over the number of a predetermined threshold value due to a change of communication environments to such an extent that even such fine adjustment of sampling timing can not follow (Step S28), main control unit 60 determines that it is difficult to maintain the synchronization tracking mode to decide to shift the mode to the synchronization acquisition mode (Step S29). When returning to the synchronization acquisition mode, a synchronous position is again detected according to the flow shown in FIG. 4 described above.

On the other hand, unless the number of reception errors in a bit output exceeds the predetermined threshold value in the demodulation processing executed at Step S27, the synchronization tracking mode is maintained (Step S30).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless receiving device for receiving a modulated signal to execute demodulation processing, comprising:
    mode setting unit for setting a synchronization acquisition mode or a synchronization tracking mode;
    signal converter for converting a received signal into a first digital signal having a first number of samples in said synchronization acquisition mode;
    synchronous position detection unit for detecting a synchronous position of said first digital signal which has been converted in said synchronization acquisition mode;
    storage unit for storing said detected synchronous position in said synchronization acquisition mode;
    demodulation processing unit for executing demodulation processing of said first digital signal based on said detected synchronous position in said synchronization acquisition mode; and
    error determination unit for determining whether said demodulated first digital signal has a reception error or not, wherein
    said mode setting unit sets said synchronization tracking mode in response to the determination that there exists no reception error made by said error determination unit,
    said signal converter converts said received signal into a second digital signal having a second number of samples less than said first number of samples in said synchronization tracking mode,
    said demodulation processing unit executes demodulation processing of said second digital signal based on the synchronous position stored in said storage unit in said synchronization tracking mode,
    said second number of samples is set such that from said received signal, at least a symbol point and points before and after said symbol point are included in sampling timing, and
    an interval between the symbol point and the points before and after said symbol point is equal to an interval between points sampled a number of times equal to said first number of samples.

2. The wireless receiving device according to claim 1, further comprising:
    timing deviation detecting unit for detecting a deviation of timing of the symbol point in said second digital signal from timing of a correct symbol point; and
    timing deviation correcting unit for correcting sampling timing of said second number of samples according to said deviation detected, wherein
    said timing deviation detecting unit includes
        a determination unit for determining timing at which a correlation value between said second digital signal and a predetermined reference signal attains the maximum value to be timing of the symbol point in said second digital signal, and
        a calculation unit for calculating an amount and a direction of said deviation based on a relationship among the absolute values of correlation values before and after said maximum value and the absolute value of said maximum value, and
    said timing deviation correcting unit corrects the sampling timing of said second number of samples based on the calculated amount and direction of said deviation.

3. The wireless receiving device according to claim 2, wherein said calculation unit includes
    a division unit for calculating a difference between the square of the absolute value of the correlation value before said maximum value and the square of the absolute value of the correlation value after said maximum value, and dividing the calculated difference by the square of the absolute value of said maximum value,
    a comparison unit for comparing the value obtained as a result of said division with a predetermined threshold value, and
    a decision unit for determining, when said obtained value is larger than said threshold value, the amount and a direction of said deviation based on said obtained value.

4. The wireless receiving device according to claim 2, wherein said calculation unit includes a decision unit for deriving a parabola passing through said maximum value and the correlation values before and after said maximum value to determine the amount and a direction of said deviation based on a difference between timing giving a maximal value of said parabola derived and timing of the symbol point of said second digital signal.

* * * * *